(12) United States Patent
Brachert

(10) Patent No.: US 6,634,277 B2
(45) Date of Patent: Oct. 21, 2003

(54) SOLENOID VALVE CONTROL AND METHOD OF CONTROLLING A SOLENOID VALVE

(75) Inventor: Jost Brachert, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 10/020,844

(22) Filed: Oct. 29, 2001

(65) Prior Publication Data

US 2002/0099488 A1 Jul. 25, 2002

(30) Foreign Application Priority Data

Oct. 28, 2000 (DE) .......................................... 100 53 606

(51) Int. Cl.$^7$ ............................................. F15B 13/044
(52) U.S. Cl. ..................................... 91/459; 251/129.05
(58) Field of Search ...................... 91/459; 251/129.05; 303/119.1

(56) References Cited

U.S. PATENT DOCUMENTS 4,974,622 A * 12/1990 Rader .................... 251/129.05

* cited by examiner

*Primary Examiner*—Edward K. Look
*Assistant Examiner*—Michael Leslie
(74) *Attorney, Agent, or Firm*—Kenyon & Kenyon

(57) ABSTRACT

A solenoid valve control is described, having a switching output stage for controlling a solenoid valve, an arrangement for preselecting a valve opening time, and an arrangement for preselecting a pressure over the valve. Also provided is an arrangement for determining a valve control time from the preselected valve opening time and the preselected pressure over the valve. A method is also described for controlling a solenoid valve which can be carried out to advantage with this solenoid valve control.

18 Claims, 4 Drawing Sheets

SOLENOID VALVE CONTROL AND METHOD OF CONTROLLING A SOLENOID VALVE

FIELD OF THE INVENTION

The present invention relates to a solenoid valve control having a switching output stage for controlling a solenoid valve, an arrangement for preselecting a valve opening time, and an arrangement for preselecting a pressure over the valve. The present invention also relates to a method of controlling a solenoid valve having the steps: controlling a solenoid valve having a switching output stage, preselecting a valve opening time and preselecting a pressure over the valve.

BACKGROUND INFORMATION

Various systems for automatically influencing the driving properties of a motor vehicle are known. These include, for example, the anti-skid system (ABS) and anti-spin control (ASC). In these systems, the pressure in a wheel brake cylinder is adjusted by solenoid valves whose switching states are influenced by a solenoid valve control. For example, in the brake system of a motor vehicle there are reversing valves (USV valves) on the path from a hydraulic pump to a master brake cylinder and inlet valves (EV valves) to a wheel brake cylinder for which solenoid valve controls are used. Both inlet valves and reversing valves, which can be operated linearly, are known. This property is utilized to an increasing extent in anti-skid systems (ABS) and anti-spin control (ASC) systems. In the case of linearly operated valves, the pressure drop over the valve is essentially a linear function of the electric valve current. Basically, the valve current can be adjusted through current-controlled valve output stages. However, such current-controlled valve output stages are expensive, so there has been a search for other options. It is already known that the valve current can be switched with inexpensive switching output stages. These switching output stages supply the electric valve voltage with pulse width modulation. A mean current can be adjusted by way of such pulse width modulation, using a freewheeling diode connected in parallel to the valve coil, so the desired pressure drop over the valve can be adjusted in this way. The freewheeling diode permits a current to flow when the output stage is turned off.

However, a disadvantage of the required freewheeling diode is that brief opening and subsequent closing of the valve are influenced to a great extent by the freewheeling diode. The reason for this great effect is that the current drops slowly when the control of the valve is shut down in comparison with a situation without a freewheeling diode. Since the switching threshold of a valve depends greatly on the pressure drop over the valve, the effect on the current characteristic due to the freewheeling diode described here leads to different switching times, depending on the pressure drop over the valve. This has resulted in different valve opening times, depending on the pressure drop over the diode, with identical valve control times.

Thus, on the whole, it is problematical to implement a pulse width-modulated control such as an LMV control (linearized solenoid valve) or CPC operation (continuous pressure control) in parallel with a pulse step control in a single solenoid valve control, because the freewheeling diode which is required for pulse width-modulated control prevents accurately implementable valve opening times. However, under some circumstances it may be desirable to use both pressure modulation principles in one controller, mainly against the background of preventing use of expensive current-regulated valve output stages. For example, it is possible to operate an anti-skid system (ABS) with a pulse width-modulated CPC on the inlet valve. In the case of anti-spin control (ASC), however, this is not possible because requirements regarding the accuracy of the set pressures are higher in anti-spin control (ASC).

SUMMARY OF THE INVENTION

The present invention is based on the generic solenoid valve control such that means are provided for determining a valve control time from the preselected valve opening time and the preselected pressure over the valve. In this way, it is possible to influence the variation in the valve opening time as a function of the pressure drop over the valve, namely by determining a "corrected" valve control time. The valve control time thus takes into account the valve current characteristic over time, for example, and therefore the effect of the switching time on the basis of the dependence of the switching thresholds on the pressure drop.

The means for preselecting a valve opening time preferably use an inverse hydraulic model. Hydraulic models are generally used in controllers to calculate a pressure on the basis of input parameters such as a valve current and a valve opening time, for example. With an inverse hydraulic model, it is possible to calculate a required valve opening time from the pressure over the valve.

The means for preselecting a pressure over the valve preferably use a pressure estimation model. Since the pressure over the valves cannot be determined directly, pressure estimation models which are contained in controllers of the related art are suitable means for estimating the required pressure for further determination of the valve control time.

It may be advantageous if the means for determining a valve control time use a table which lists pressure values and the respective correction values. Each pressure value can thus be assigned a certain correction value, for example, which transforms the preselected valve opening time into a valve control time. It is also conceivable for each pressure value to be assigned multiple correction values, one of the correction values being used to determine the time for opening the valve, for example, and another correction value being used for the time for closing the valve.

However, it may also be advantageous if the means for determining a valve control time model the time dependence of the valve current and the current dependence of the valve opening pressure. The required valve control times can thus be determined by determining functional relationships between the valve current and time or between valve opening pressure and current. The functional relationships can be determined mathematically or empirically in good approximation.

For example, the fact that the valve current may have an essentially exponential time dependence may be utilized. Mathematical models can be constructed easily with such exponential relationships.

It may also be advantageous if the means for determining the valve control time use an approximation function. The valve control time can be determined approximately by using approximation functions, this being sufficient for numerous applications.

A freewheeling diode is preferably connected in parallel with the solenoid valve, thus yielding LMV operation or CPC operation with pulse width-modulated voltage in parallel with pulse step control. In CPC operation, pulse width modulation takes place continuously, whereas in LMV operation, pulse width modulation takes place in phases, while at other times the valve is closed. Since a freewheeling diode in parallel with the solenoid valve is used for both modes of operation, the pressure dependence of the switching times of the valve is especially great. Therefore, the present invention manifests its advantages especially in such parallel operation of pulse step control and pulse width-modulated control.

The present invention also manifests its particular advantages due to the fact that there is CPC operation at the inlet valve of a brake cylinder for an anti-skid system control (ABS control), and there is pulse step control at the inlet valve of a brake cylinder for an anti-spin control (ASC) system. It is thus possible to eliminate current-regulated valve output stages in an inexpensive manner. For ABS control, pulse width-modulated CPC operation may be used at the inlet valve of the brake cylinder. This is not possible with anti-spin control (ASC), if no current-regulated valve output stages are to be used at the inlet valves.

The present invention is based on the generic method such that a valve control time is determined from the preselected valve opening time and the preselected pressure over the valve. In this way, it is possible to influence the variation in the valve opening time as a function of the pressure drop over the valve, namely by determining a "corrected" valve control time. The valve control time thus takes into account the valve current characteristic over time, for example, and therefore the effect of the switching time on the basis of the dependence of the switching thresholds on the pressure drop.

A valve opening time is preferably preselected by using an inverse hydraulic model. With an inverse hydraulic model, it is possible to calculate a required valve opening time from the pressure over the valve.

A pressure over the valve is preferably preselected by using a pressure estimation model. Since pressure over the valves cannot be determined directly, pressure estimation models which are contained in controllers of the related art are suitable means for estimating the required pressure for further determination of the valve control time.

It may be beneficial if a valve control time is determined by using a table which lists pressure values and the respective correction values. Each pressure value can thus be assigned a certain correction value, for example, which transforms the preselected valve opening time into a valve control.

However it may also be beneficial if the time dependence of the valve current and the current dependence of the valve opening pressure are modeled when determining a valve control time. The required valve control times can thus be determined by determining the functional relationships between the valve current and the time or between the valve opening pressure and the current. The functional relationships can be determined mathematically or empirically in good approximation.

It is especially beneficial for the modeling if the valve current has an essentially exponential time dependence. Mathematical models can be constructed easily with such exponential relationships.

However, it may also be beneficial if a valve control time is determined by using an approximation function. The valve control time can be determined approximately by using approximation functions, this being sufficient for numerous applications.

The present invention is especially advantageous due to the fact that a freewheeling diode is connected in parallel with the solenoid valve, thus yielding LMV operation or CPC operation with pulse width-modulated voltage in parallel with pulse step control. In CPC operation, pulse width modulation takes place continuously, whereas in LMV operation, pulse width modulation takes place in phases, while at other times the valve is closed. Since a freewheeling diode in parallel with the solenoid valve is used for both modes of operation, the pressure dependence of the switching times of the valve is especially great. Therefore, the present invention manifests its advantages especially in such parallel operation of pulse step control and pulse width-modulated control.

However, the present invention also manifests particular advantages due to the fact that there is CPC operation at the inlet valve of a brake cylinder for an anti-skid system control (ABS control) and there is pulse step control at the inlet valve of a brake cylinder for an anti-spin control (ASC) system. It is thus possible to eliminate current-regulated valve output stages in an inexpensive manner. For ABS control, pulse width-modulated CPC operation may be used at the inlet valve of the brake cylinder. This is not possible with anti-spin control (ASC), if no current-regulated valve output stages are to be used at the inlet valves.

The present invention is based on the surprising finding that the valve control time can be determined in the case of a switching output stage even with valve opening thresholds that have a great dependence on pressure. This has advantages with regard to the combination of pulse width-modulated control with pulse step control, because in pulse width-modulated control, a freewheeling diode is connected in parallel with the valve coil, which leads a great influence over time on the current characteristic.

DETAILED DESCRIPTION

Figure 1:
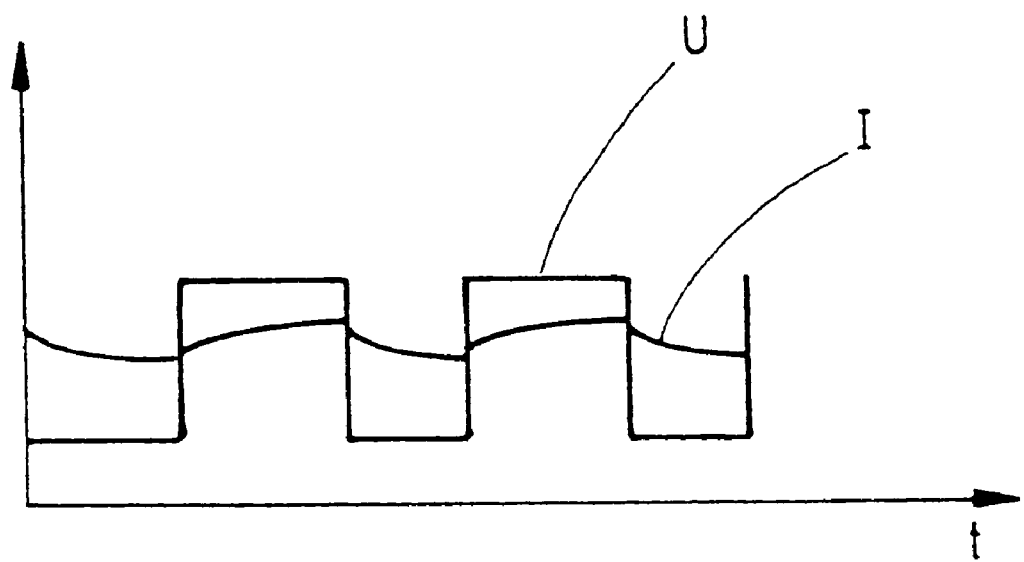
FIG. 1 shows a voltage characteristic and a current characteristic for pulse width modulation.

FIG. 1 shows voltage U and current I plotted qualitatively over time t, such as those occurring in pulse width-modulated systems. A mean current, which is established on the basis of pulsed voltage U, can be influenced in terms of its size by the width of the voltage pulses. To permit a current to flow even when the output stage is turned off, a freewheeling diode is preferably connected in parallel with the valve coil.

Figure 2:
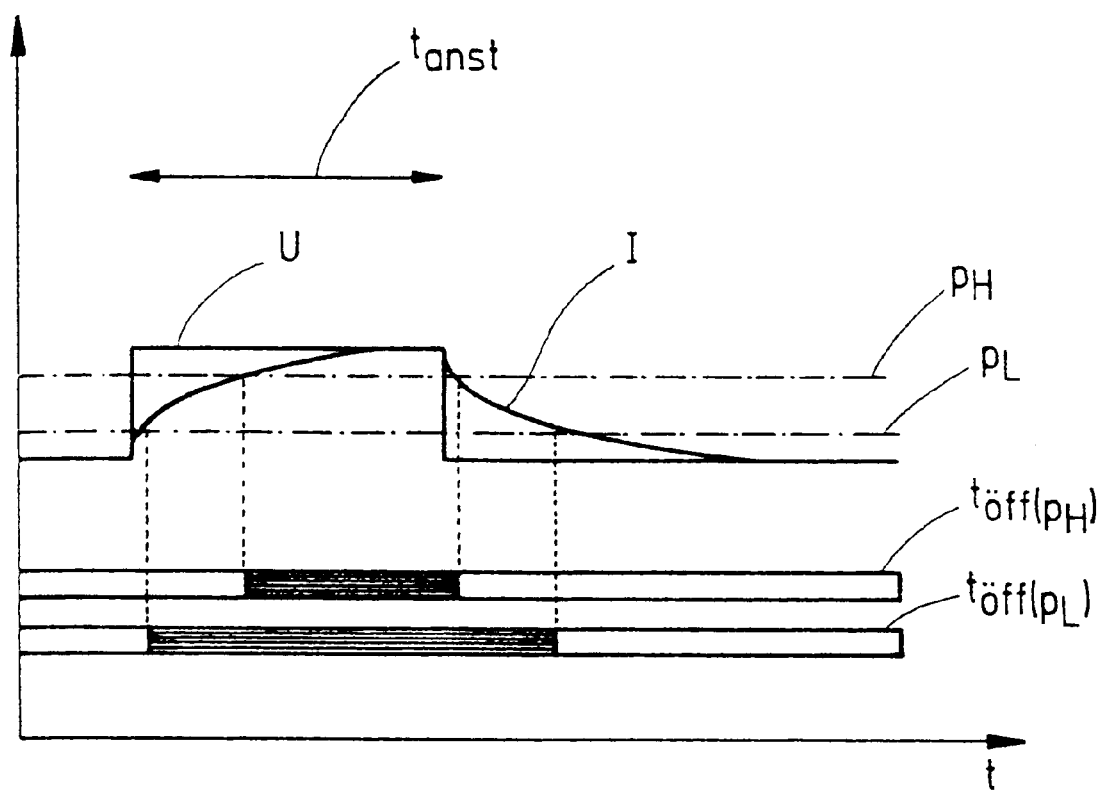
FIG. 2 shows a voltage characteristic and a current characteristic and their effect on valve behavior.

FIG. 2 shows the consequences of the presence of such a freewheeling diode, namely the marked time dependence of current I. The control time of the valve is shown as $t_{anst}$. Depending on the pressure relationships over the valve, this control time $t_{anst}$ can lead to different valve opening times $t_öff$. This is due to the fact that a higher current is used to switch the valve at high pressures than at low pressures. For example, the valve switches to an opened state later in the case of a pressure $P_H$ than a pressure $P_L$. Conversely, the valve closes sooner at a high pressure $P_H$ than at a low pressure $P_L$. Opening time is thus much shorter at a high pressure $t_öff(P_H)$ than at a low pressure $t_öff(P_L)$.

Figure 3:
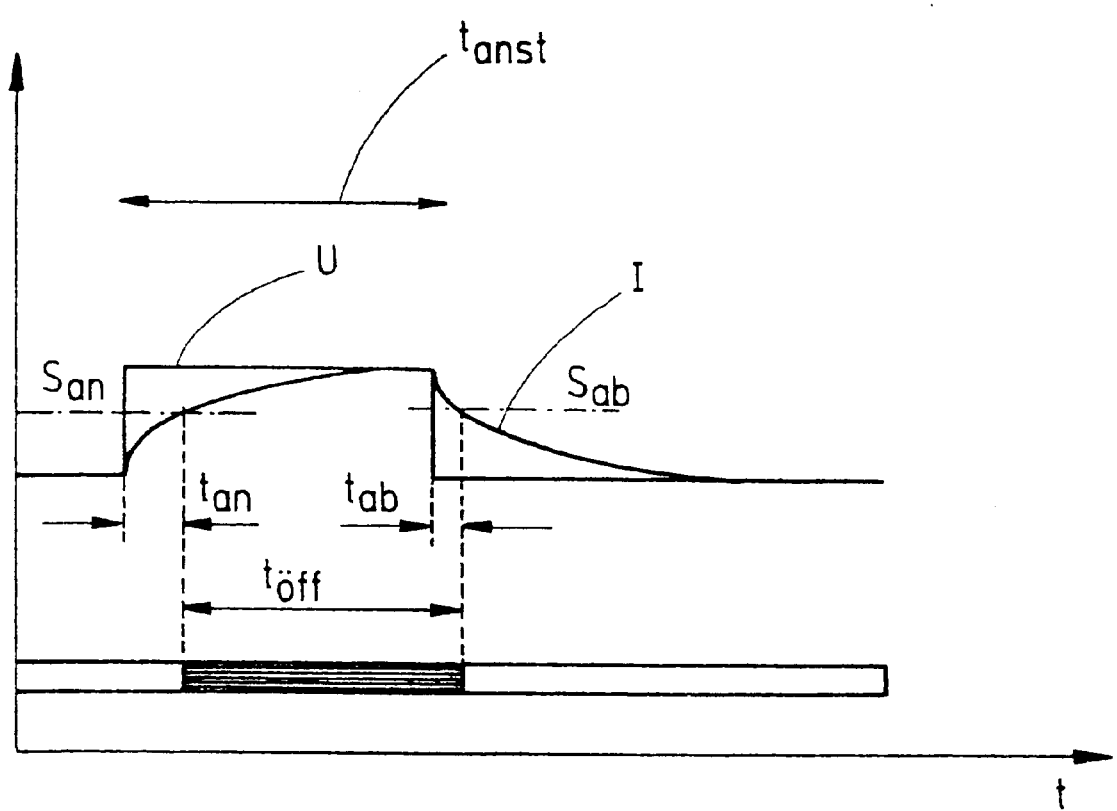
FIG. 3 shows a voltage characteristic and a current characteristic according to FIG. 2 for the mathematical illustration of possible models.

FIG. 3 shows a diagram similar to that in FIG. 2 to illustrate mathematical models. For calculation of valve control time $t_{anst}$, the dependence of current threshold $s_{an}$ at which the valve opens on the pressure over the valve is determined first. Furthermore, current threshold $s_{ab}$ at which the valve closes again on the pressure is determined. In good approximation, these thresholds are essentially a linear function of pressure. However, these current thresholds can also be determined empirically in model experiments. The relationship between current threshold $s_{an}$ and the time after which the valve opens is given approximately by an exponential function:

$$s_{an} = 1 - \exp(-c_{an} \cdot t_{an}).$$

Parameter $C_{an}$ is determined largely by the inductance and resistance of the valve coil. The simplest method of determining it is empirically by using model experiments. Rearranging the equation yields $$t_{an} = -(1/c_{an}) \cdot \ln(1 - s_{an})$$

Like $s_{an}$, the relationship between $s_{ab}$ and $t_{ab}$ is also given by an exponential function:

$$s_{ab} = \exp(-c_{ab} \cdot t_{ab}).$$

Under ideal conditions, parameter $c_{ab}$ is equal to $c_{an}$. However, there may be deviations due to different electrical relationships. Rearranging yields:

$$t_{ab} = -(1/c_{ab}) \cdot \ln(s_{ab}).$$

The time during which the valve is open is obtained as follows $$t_{off} = t_{anst} - t_{an} + t_{aus}.$$

The valve control time can thus be determined as follows:

$$t_{anst} = t_{off} + t_{an} - t_{aus}.$$

The equations for $s_{an}$ and $s_{ab}$ are interchanged in the case of valves having "inverse" control, i.e., where the pressure pulse is induced by removing the voltage, e.g., in the case of inlet valves (EV) and reversing valves (USV).

Since it is complicated to calculate the natural logarithm within the control, it is advisable to approximate the relationship described here in the controller by an approximation function or to store this relationship in the form of a table or in an engine characteristics map, where $t_{an} - t_{aus}$ is listed as a function of pressure. This table or this engine characteristics map can also be directly determined empirically, so it is no longer necessary to determine in detail individual parameters $c_{an}$, $c_{ab}$, $s_{an}$ as a function of pressure and $s_{ab}$ as a function of pressure.

Figure 4:
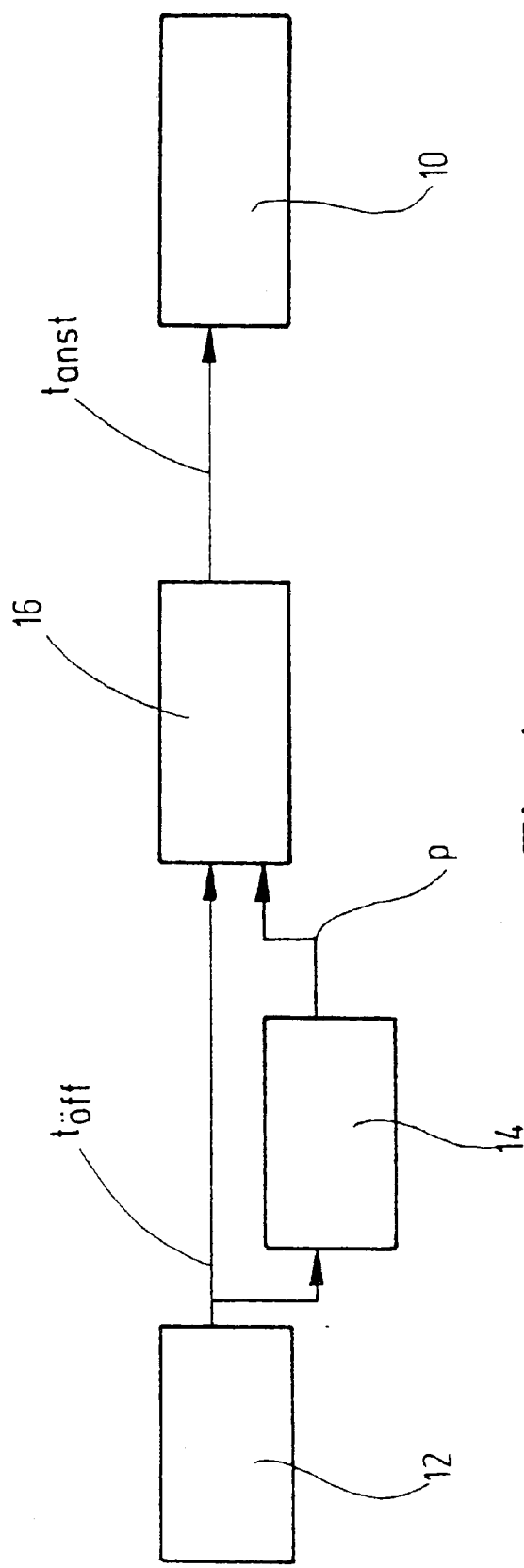
FIG. 4 shows a schematic diagram of a solenoid valve control according to the present invention.

FIG. 4 shows a schematic diagram of a solenoid valve control. A solenoid valve 10 is controlled during time $t_{anst}$. To this end, a valve opening time $t_o$ffis preselected by a controller 12. In addition, pressure p over the valve is determined from these valve opening times by using a pressure estimation model 14. This valve control time $t_{anst}$ is calculated in means 16 for determining the valve control time from valve opening time $t_o$ffand pressure p.

The previous description of embodiments according to the present invention is used to illustrate the present invention but not to restrict it in any way. Various alterations and modifications are possible within the scope of the present invention without going beyond the scope of the present invention or its equivalents.

What is claimed is:

1. A solenoid valve control, comprising:
    a switching output stage for controlling a solenoid valve;
    an arrangement for preselecting a valve opening time;
    an arrangement for preselecting a pressure over the solenoid valve; and
    an arrangement for determining a valve control time from the preselected valve opening time and the preselected pressure over the solenoid valve.

2. The solenoid valve control according to claim 1, wherein:
    the arrangement for preselecting the valve opening time operates in accordance with an inverse hydraulic model.

3. The solenoid valve control according to claim 1, wherein:
    the means for preselecting the pressure over the solenoid valve operates in accordance with a pressure estimation model.

4. The solenoid valve control according to claim 1, wherein:
    the arrangement for determining the valve control time operates in accordance with a table that lists pressure values and respective correction values.

5. The solenoid valve control according claim 1, wherein:
    the arrangement for determining the valve control time models a time dependence of a valve current and a current dependence of a valve opening pressure.

6. The solenoid valve control according to claim 5, wherein:
    the valve current has an exponential time dependence.

7. The solenoid valve control according to claim 1, wherein:
    the arrangement for determining the valve control time operates in accordance with an approximation function.

8. The solenoid valve control according to claim 1, further comprising:
    a freewheeling diode connected in parallel with the solenoid valve, so that one of an LMV operation (linearized solenoid valve) and a CPC operation (continuous pressure control) having pulse width-modulated voltage in parallel with pulse step control can occur.

9. The solenoid valve control according to claim 8, wherein:
    the CPC operation is implemented at an inlet valve of a brake cylinder for an anti-skid system control, and
    the pulse step control is implemented at an inlet valve of a brake cylinder for an anti-spin control system.

10. A method of controlling a solenoid valve, comprising the steps:
    controlling the solenoid valve including a switching output stage;
    preselecting a valve opening time;
    preselecting a pressure over the solenoid valve; and
    determining a valve control time from the preselected valve opening time and the preselected pressure over the solenoid valve.

11. The method according to claim 10, further comprising the step of:
    preselecting the valve opening time in accordance with an inverse hydraulic model.

12. The method according to claim 10, further comprising the step of:
    preselecting the pressure over the solenoid valve in accordance with a pressure estimation model.

13. The method according to claim 10, wherein:

the valve control time is determined in accordance with a table that lists pressure values and respective correction values.

14. The method according to claim 10, further comprising the step of:

modeling a time dependence of a valve current and a current dependence of a valve opening pressure when determining the valve control time.

15. The method according to claim 10, wherein:

a valve current has an exponential time dependence.

16. The method according to claim 10, wherein:

the valve control time is determined in accordance with an approximation function.

17. The method according to claim 10, wherein:

a freewheeling diode is connected in parallel with the solenoid valve, so that one of an LMV operation (linearized solenoid valve) and a CPC operation (continuous pressure control) having pulse width-modulated voltage in parallel with pulse step control can occur.

18. The method according to claim 10, wherein:

the CPC operation is implemented at an inlet valve of a brake cylinder for an anti-skid system control, and the pulse step control is implemented at an inlet valve of a brake cylinder for an anti-spin control system.

* * * * *

UNITED STATES PATENT AND TRADEMARK OFFICE
CERTIFICATE OF CORRECTION

PATENT NO. : 6,634,277 B2
DATED : October 21, 2003
INVENTOR(S) : Jost Brachert

It is certified that error appears in the above-identified patent and that said Letters Patent is hereby corrected as shown below:

Column 4,
Line 67, change "pressure $t_{oöff}$ ($P_H$) than at a low pressure $t_oƒƒ$ ($P_L$)" to -- pressure $t_{öff}$ ($P_H$) than at a low pressure $t_{öff}$ ($P_L$) --

Column 5,
Line 56, change "opening time $t_öƒƒis$" should read -- opening time $t_{öff}$ is --
Line 61, change "$t_öƒƒand$" to -- $t_{öff}$ and --

Signed and Sealed this

Twenty-second Day of February, 2005

JON W. DUDAS
*Director of the United States Patent and Trademark Office*